(No Model.)
H. FRIEDRICH.
TRAP FOR SINKS, &c.
No. 298,841. Patented May 20, 1884.
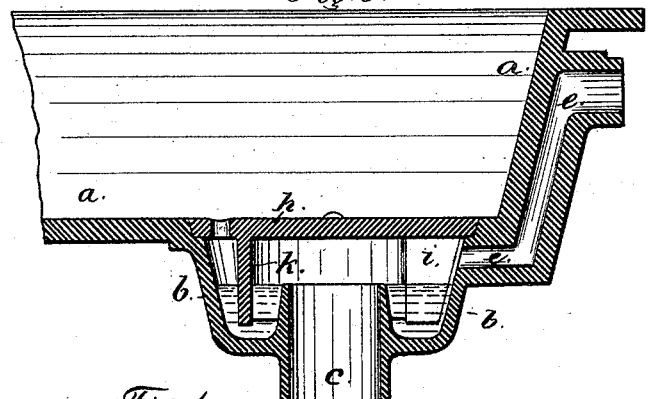
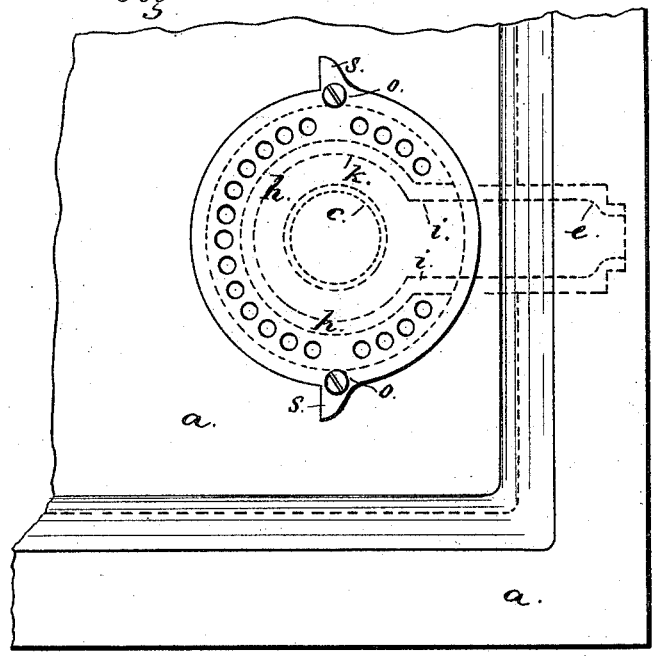
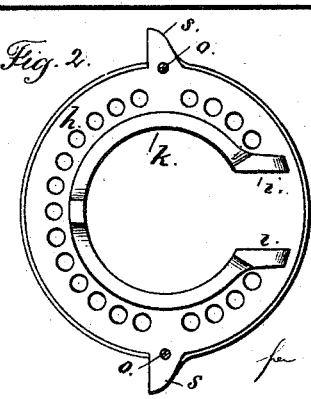
Witnesses
Chas. H. Smith
Harold Serrell
Inventor
H. Friedrich
for Lemuel W. Serrell
atty

UNITED STATES PATENT OFFICE.

HENRY FRIEDRICH, OF EAST PORT CHESTER, CONNECTICUT.

TRAP FOR SINKS, &c.

SPECIFICATION forming part of Letters Patent No. 298,841, dated May 20, 1884.

Application filed January 7, 1884. (No model.)

*To all whom it may concern:*

Be it known that I, HENRY FRIEDRICH, of East Port Chester, in the State of Connecticut, have invented an Improvement in Traps for Sinks, Basins, &c., of which the following is a specification.

Traps for sinks, &c., have been made with an annular dish around the upper end of the sewer-pipe in which a small quantity of water remains, and there has been a flange depending from the under side of the strainer that dips into the water in this dish. Ventilating-tubes have been used with water-closets and with sinks.

My invention relates to an improved ventilating-trap in which the trap is sealed to prevent odors from the sewer-pipe passing into the room or apartment, and at the same time the ventilating-pipe always remains open to prevent any siphon action drawing the water out of the trap, and to convey away any gases or odor from the sewer.

In the drawings I have represented this improvement as applied to a sink.

Figure 1 is a plan of the end portion of a sink. Fig. 2 is an inverted plan of the strainer-plate, and Fig. 3 is a vertical section through the trap and ventilating-pipe.

The sink or basin $a$ is of any desired size or shape. It is provided with an annular dish, $b$, beneath the bottom, and a central tube, $c$, to which the sewer-pipe is connected, and at $e$ is the ventilating-pipe passing out from one side of the annular dish and rising, so as to be connected to a ventilating-tube that passes outside the building. The annular dish $b$ is of sufficient depth around and below the upper end of the central pipe, $c$, for forming a seal, and there is a strainer-plate, $h$, covering the said dish $b$, and having a hanging flange, $k$, that passes down below the top of the pipe $c$, that is connected to the sewer, so as to dip into the water. This flange is not entirely cylindrical, but it terminates as two wings, $i\ i$, that fit tightly against the inner surface of the annular dish at each side of the ventilating-pipe $e$. There are openings through the plate $h$ around outside the flange $k$, and wings $i$ for the passage of water out of the sink; but there are not any openings within the flange $k$ or between the wings; hence so long as there is water in the dish $b$ of the trap and the wings $i$ are made tight against the sides of the trap gases cannot escape into the apartment containing this sink or basin, but the gases go off freely by the ventilator-pipe. The plate $h$ is secured by screws $o$. The edges of the plate are received into recesses in the sink, so that the surface of the strainer-plate is lower than the surrounding portions of the sink, and I make ears at $s$ for the screws to pass through; but these ears are not alike on their opposite edges, or the outline of the plate $h$ is irregular, so that the plate will only go into the recess when it is properly placed. This insures the correct position of the wings in relation to the ventilating-pipe. Putty will usually be employed at the edges of the strainer-plate and of the wings, so as to make the parts gas-tight.

I claim as my invention—

1. The sink $a$, having dish $b$, upward-extending outlet $c$, and ventilating-channel $e$, in combination with strainer $h$, having flange $k$, and wings $i$, substantially as set forth.

2. The combination, in a basin-trap, of an annular dish around the waste-pipe, a ventilating-pipe, a removable strainer-plate having a depending flange and wings at the under side, such strainer-plate having an irregular form at its edges, so that it can only be entered one way into its recess around the dish, substantially as set forth.

Signed by me this 3d day of January, A. D. 1884.

HENRY FRIEDRICH.

Witnesses:
 GEO. T. PINCKNEY,
 WILLIAM G. MOTT.